United States Patent [19]
Johnson et al.

[11] Patent Number: 5,129,643
[45] Date of Patent: Jul. 14, 1992

[54] APPARATUS FOR STACKING PASTED BATTERY PLATES

[75] Inventors: Peter E. Johnson; David A. Johnson, both of Corvallis, Oreg.

[73] Assignee: Neids, Inc., Tangent, Oreg.

[21] Appl. No.: 628,469

[22] Filed: Dec. 17, 1990

[51] Int. Cl.$^5$ .................. B65H 29/66; B65H 33/06; B65G 47/29
[52] U.S. Cl. .............................. 271/216; 271/182; 271/151; 414/794.4; 414/789
[58] Field of Search .................. 414/789, 791.4, 794.4, 414/790.7, 901, 902, 792.7, 788.9; 198/458, 836.1; 271/216, 182, 151, 258, 256

[56] References Cited

U.S. PATENT DOCUMENTS

| | | | |
|---|---|---|---|
| 2,693,885 | 11/1954 | Junco | 414/790.7 |
| 2,852,990 | 9/1958 | Roe | 414/798 |
| 2,919,789 | 1/1960 | Coakley | 271/216 |
| 3,149,834 | 9/1964 | Faeber | 271/258 |
| 3,379,299 | 4/1968 | Griner | 198/458 |
| 3,527,460 | 9/1970 | Lopez | 414/789 X |
| 3,596,575 | 8/1971 | Brucküller | 414/789 |
| 3,683,758 | 8/1972 | Feldkamper | 414/794.4 X |
| 3,724,840 | 4/1973 | Kuckhermann | 271/182 X |
| 3,768,382 | 10/1973 | Zernov et al. | 271/216 |
| 3,870,921 | 1/1959 | Winkel | 414/790.7 |
| 3,880,059 | 4/1975 | Brockmüller | 414/789 |
| 3,886,741 | 2/1975 | Carbon et al. | 414/789 |
| 4,006,831 | 2/1977 | Jimenez | 414/789 |
| 4,546,371 | 10/1985 | Duke | 271/182 X |
| 4,669,720 | 6/1987 | Rosati | 271/182 X |
| 4,997,323 | 3/1991 | Giandalia et al. | 198/836.1 X |

OTHER PUBLICATIONS

Article From Batteries International Magazine, Apr. 1990 Edition, pp. 20 and 21.

*Primary Examiner*—Robert J. Spar
*Assistant Examiner*—B. Dinicola
*Attorney, Agent, or Firm*—Chernoff, Vilhauer, McClung & Stenzel

[57] ABSTRACT

Battery plates from the high speed output conveyor of a pasted plate making machine are deposited onto a lower speed first conveyor in an overlapped fashion to create a shingled stream of plates. As plates drop off of the discharge end of the first conveyor they are accumulated in vertical stacks on a second conveyor that is located below the first conveyor. Whenever a stack is completed the second conveyor is moved approximately one plate width to remove the stack and the process continues. In order to provide time to move the stack, the flow of plates on the first conveyor is disrupted when the stack is being moved. In the preferred embodiment the disruption is caused by squeezing the plates between the jaws of a clamping mechanism that the plates pass through. A counter is used to count the number of plates in a stack and a controller causes the clamping mechanism to be engaged at the proper time, causes the second conveyor to remove the just-formed stack and then causes the second conveyor to stop and the clamping mechanism to be reopened so that a second stack can be formed. A gate extends across the second conveyor when the stack is being formed to ensure that the stack is straight. The gate is raised upon command from the controller when movement of the second conveyor commences and lowered again when movement of the second conveyor ceases.

4 Claims, 3 Drawing Sheets

APPARATUS FOR STACKING PASTED BATTERY PLATES

BACKGROUND AND SUMMARY OF THE INVENTION

This invention relates to a machine for forming vertical stacks of plates from a stream of plates transported horizontally on a conveyor in a shingled fashion.

The plates used in storage batteries are formed by placing a lead oxide paste on a cast grid. The plates are then flash dried to remove moisture from the paste and cause it to set up. This process is accomplished in a pasted plate machine which is standard in the industry. All of the moisture is not removed from the plates during flash drying, however, and thus the plates that are discharged from the plate machine are not completely rigid and are somewhat tacky. The plates exit the machine on an output conveyor at a high rate of speed which makes them difficult to handle and form into the horizontal stacks which are used in the remainder in the battery construction process.

Traditionally, the plates have been deposited onto a slower speed conveyor and then removed from the slower conveyor and formed into stacks by hand. Due to its lower speed, the plates are deposited on the slower conveyor in an overlapping shingled fashion. Thus, they can be removed simply by stopping movement of the first plate with one hand which causes the plates to bunch together so that a group of the plates can be lifted off of the conveyor and formed into a stack. Since the stacks are quite heavy and the machines create a hot dusty environment, this is a difficult job and it is desirable to automate the stacking process.

In other industries plates that are provided in a shingled fashion are stacked by interrupting the movement of the first plate, thereby causing the plates to stand up on end and form a horizontal stack which can be removed with a clamping mechanism. However, freshly made battery plates are not slippery enough or stiff enough to form stacks in this manner.

Prior art machines have been provided to stack plates from a pasted plate machine. However, the difficulty in causing a pause between plates in a shingled stream of plates, as is necessary for removal of the stacks, has caused these machines to handle plates moving at the high output speed of the plate machine, or even increase their speed to form a separation between plates. Prior art stackers of this type are manufactured by Wirtz Manufacturing Co., Inc. of Port Huron, Mich. and Uranio SpA, Sovema Division via Torricelli of Verona, Italy. These prior art devices have been able to form stacks by diverting plates or temporarily supporting plates to create a pause between stacks. However, due to the high speed involved, slight variations in the timing of the arrival of plates at the diversion device cause the diversion to often be too early or too late. As a result errors occur which make the machines unreliable. In addition, the high speed sorting makes the machines extremely expensive. Accordingly, hand stacking remains the norm.

The subject invention overcomes the shortcomings of the prior art by forming vertical stacks of plates from a shingled stream by merely allowing the plates to drop off at the discharge end of the slower speed conveyor they are being carried on onto a second conveyor that is not moving until a stack is formed on the second conveyor. Each completed stack is then removed by moving the second conveyor after the last plate is deposited on the stack. The stream of plates is prevented from moving with the first conveyor when the second conveyor is being moved in order to create the necessary pause between stacks. This preferably is accomplished by squeezing the plates between the jaws of a clamp mechanism Because clamping is equally effective over the entire length of a plate, slight variations in timing of the plates does not create a problem, particularly when the plates are traveling on a slower speed conveyor when the clamping occurs.

In a preferred embodiment, a raisable gate located across the second conveyor engages the plates as they fall from the first conveyor and causes the stacks to be straight. Also in the preferred embodiment, a controller activates the clamp when the proper number of plates has passed the clamp. After a sufficient time for the plates downstream of the clamp to be discharged and complete the stack, the controller raises the gate and starts the second conveyor moving. After the stack has been moved out of the way the controller stops the second conveyor, lowers the gate and releases the clamp and another stack is formed. The controller can be annunciated by a counter that counts the plates on the second conveyor or by a sensor that measures the height of the stack.

Since plate making machines typically produce plates in side-by-side pairs, two side-by-side second conveyors are provided. If it is desired to align the plates transversely on the conveyors before they are displaced onto a stack, the conveyors can diverge from one another in order to allow an alignment machine to be placed on each side of both conveyors.

Accordingly, it is a principal object of the subject invention to provide a method for forming a vertical stack of plates from a shingled stream of horizontally oriented plates.

It is a further object of the present invention to also provide a disruption in the flow of the plates while a completed stack is being moved from the spot where it is formed.

It is a still further object of the subject invention to provide an apparatus for practicing the foregoing method.

It is a further object of the subject invention to provide such an apparatus which is not affected by variations in the timing of the plates.

It is a yet further object of the present invention to provide such an apparatus that clamps the plates to disrupt their flow.

It is a further object of the subject invention to provide such an apparatus that causes side-by-side pairs of plates from the plate making machine to be separated from one another before they are formed into stacks to facilitate lateral alignment of the plates.

The foregoing and other objectives, features and advantages of the present invention will be more readily understood upon consideration of the following detailed description of the invention taken in conjunction with the accompanying drawings.

PREFERRED EMBODIMENT OF THE INVENTION

Figure 1:
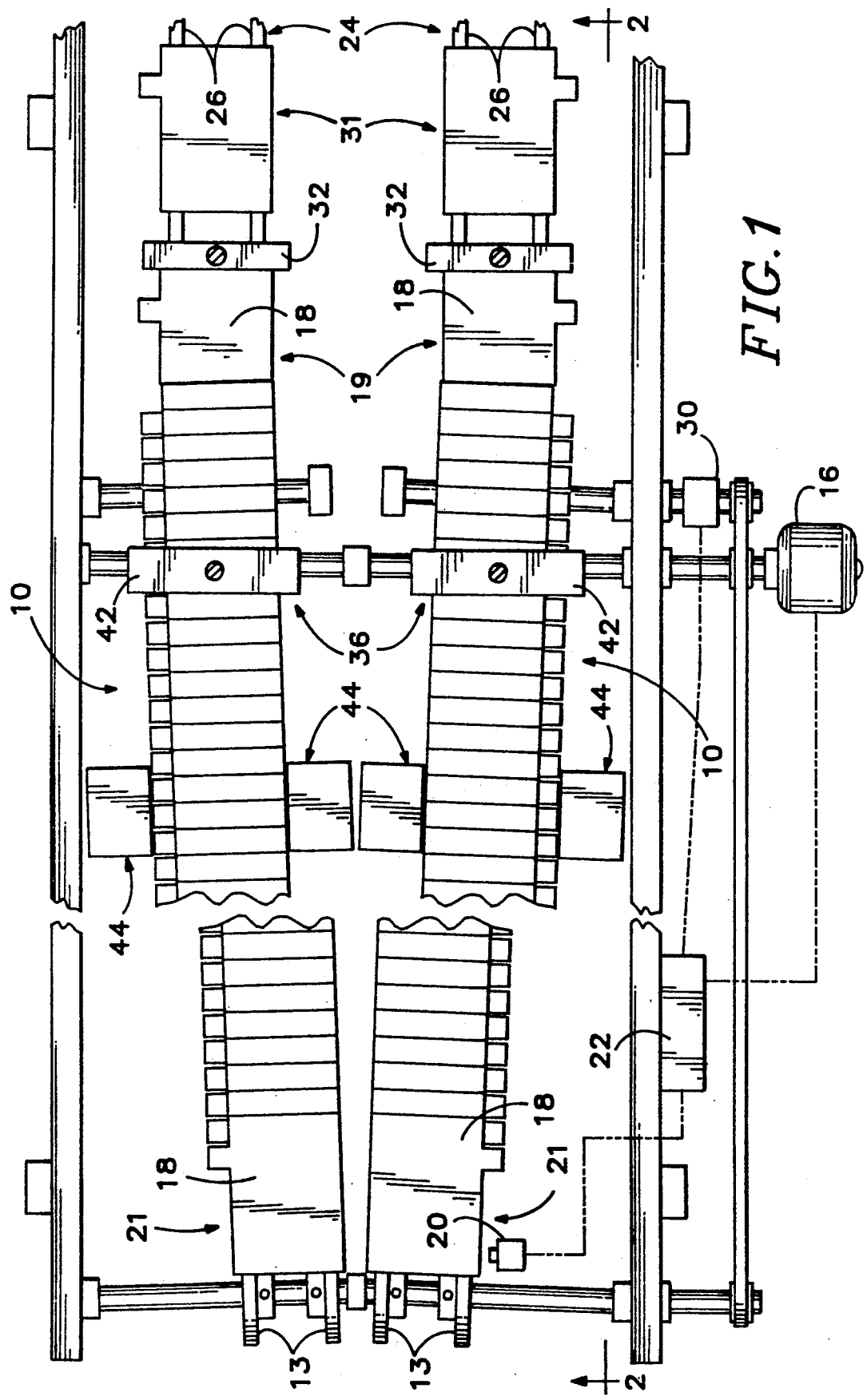
FIG. 1 is a foreshortened plan view, partially broken away to show hidden detail, of a plate stacking machine embodying the subject invention.
Figure 2:
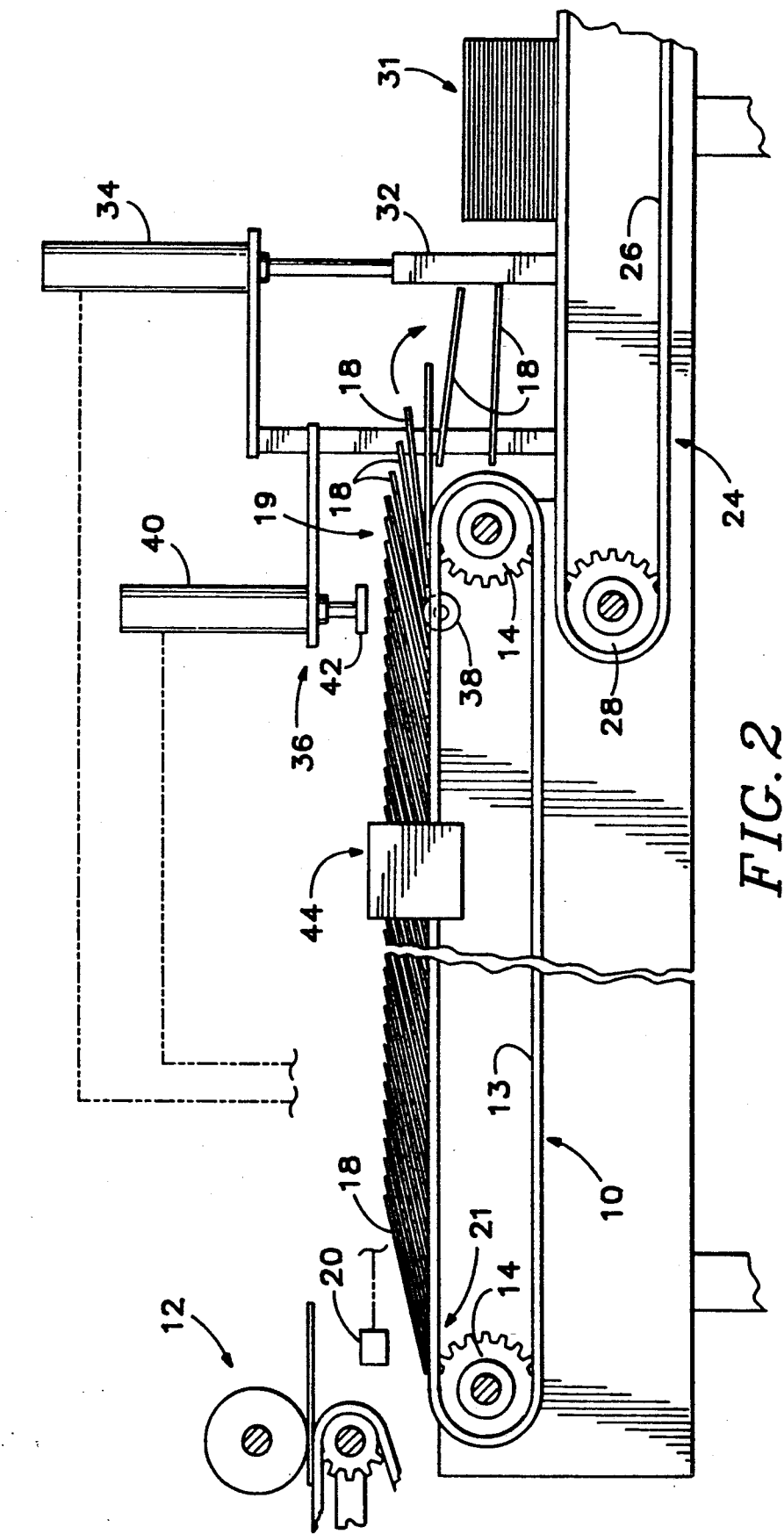
FIG. 2 is a sectional view taken along the line 2—2 in FIG. 1.

Referring to FIGS. 1 and 2 of the drawings, a stacker embodying the features of the subject invention comprises a pair of side-by-side first conveyors 10 which are located slightly below the end of the output conveyor 12 of a pasted plate manufacturing machine. The pasted plate machine, which is standard in the industry, produces battery plates in side-by-side pairs at a high rate of speed. Each first conveyor is illustrated as utilizing a pair of spaced-apart continuous chains 13 that are carried on rotatable sprockets 14. The sprockets at one end of the first conveyors are driven by a drive motor 16. The first conveyors are aligned to receive plates from the plate machine output conveyor and move them in generally the same direction that they were traveling, however, the two first conveyors diverge relative to one another as they extend away from the plate machine. In addition, the first conveyors travel at a much slower speed than the output conveyor. Thus, the adjacent side-by-side plates 18 from the plate machine drop off of the end of the output conveyor onto the first conveyors in an overlapping manner to provide two streams of shingled plates which are separated from one another when they reach the discharge ends 19 of the first conveyors.

In the embodiment illustrated, a counter 20 is located at the inlet ends 21 of the first conveyors 10 to count each pair of plates that drops onto the first conveyors. Alternatively, a timer could be used in place of the counter or an electric eye could be used to determine when the stack reaches the desired height. The counter 20 or other device annunciates a controller 22 that controls the operation of the stacker.

A pair of second conveyors 24, which are similar to the first conveyors 10, are located below the discharge ends of the first conveyors. The first and second conveyors are illustrated as being generally axially aligned with one another but they do not have to be. The second conveyors are vertically separated from the first conveyors by a distance which is slightly more than the height of the largest stack that will be formed. The second conveyors include pairs of side-by-side endless chains 26 that are carried on sprockets 28. The second conveyor 24 is driven by the motor 16 through a chain 29. A clutch 30 associated with the second conveyor permits it to be stopped and started without stopping the motor 16. The motor 16 and clutch 30 are controlled by the controller 22 which receives input from the counter 20.

The first conveyors 10 move whenever the stacker is in operation. The second conveyors 24, on the other hand, generally do not move. Thus, plates that drop off of the discharge ends 19 of the first conveyors form vertical stacks 31 on the second conveyors. Because the plates have a forward velocity as they drop off the discharge ends of the first conveyors, a gate 32 is removably placed across each second conveyor approximately one plate width from the discharge ends of the first conveyors. The plates lightly strike the gate as they fall downwardly and forwardly, thereby causing the stacks to be straight. The gates 32 are attached to actuators 34 which allow them to be moved between lowered positions adjacent to the second conveyors and raised positions above the height of the stacks. The actuators 34 are moved between their raised and lowered positions by the controller 22.

Figure 3:
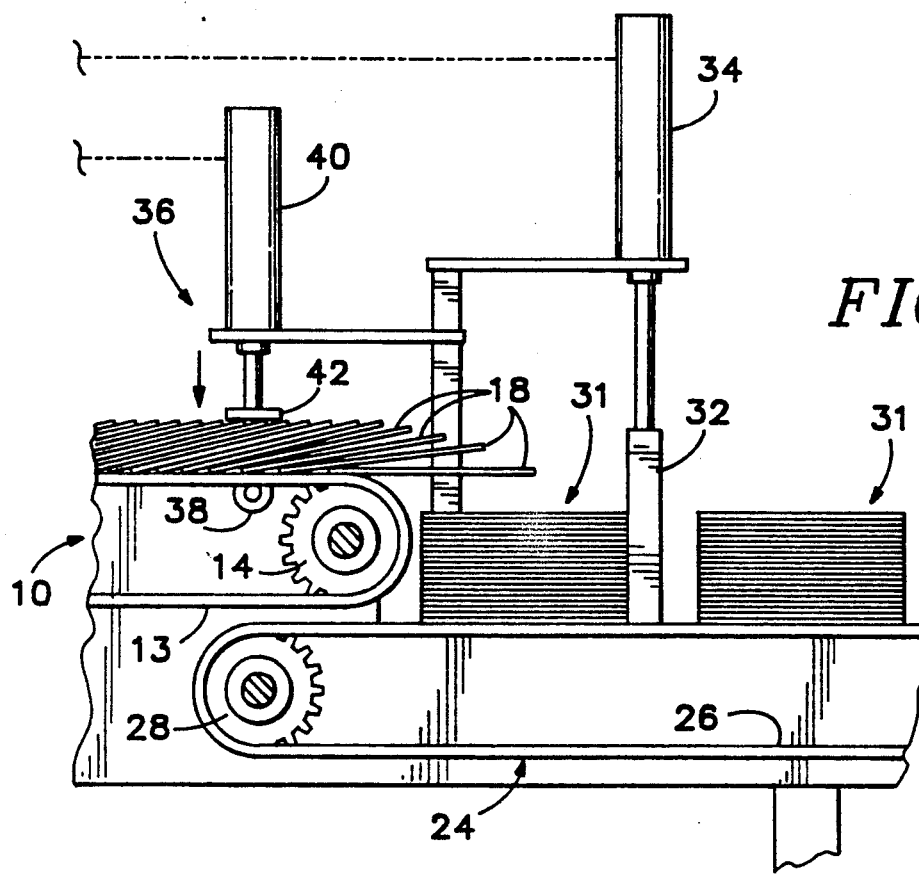
FIGS. 3 and 4 are fragmentary sectional views, similar to FIG. 2, showing the sequence of operation of the machine.

In order to stop the plates from exiting the discharge ends of the first conveyors when the second conveyors are moving, a clamping mechanism 36 engages the plates and prevents them from moving with the conveyors. In the embodiment illustrated, the clamping mechanism includes an elongate roller 38 that fits between the chains of each first conveyor and projects slightly above the plane of the chains. Thus, the plates are lifted off of the conveyors as they pass over the rollers 38. Located above each roller 38 is an actuator 40 that has a pinch plate 42 attached to its piston. The pinch plates have approximately the same length as the rollers 38 that they mate with. The actuators 40 are controlled by the controller 22 and are movable between lowered positions, FIGS. 3 and 4, where the plates are clamped between the pinch plates and rollers, and raised positions above the plates. Since it does not matter where the clamp contacts the plate, timing is not as critical as it is when plates are diverted. The fact that the plates are traveling on a relatively low speed conveyor makes timing even less of an issue.

While the plates from a plate machine are generally aligned, the divergence of the first conveyors permits an alignment apparatus, shown schematically at 44, to be placed near the discharge ends of the first conveyors.

In operation, plates 18 exiting the output conveyor of the plate machine are accumulated on the slower speed first conveyors 10 in a shingled stream. As the plates reach the discharge ends 19 of the first conveyors, they drop onto the second conveyors and form stacks 31. When the number of plates required to form a complete stack has been counted by the counter 20, the controller 22 causes the actuators 40 to move the pinch plates 42 downwardly and clamp the plates between the pinch plates and the rollers 38, FIG. 3. Since the rollers raise the plates above the conveyors, the pinch plates do not clamp the plates against the chains and the conveyors can continue to operate unimpeded. This causes the following plates to bunch up slightly but only over a short distance.

Figure 4:
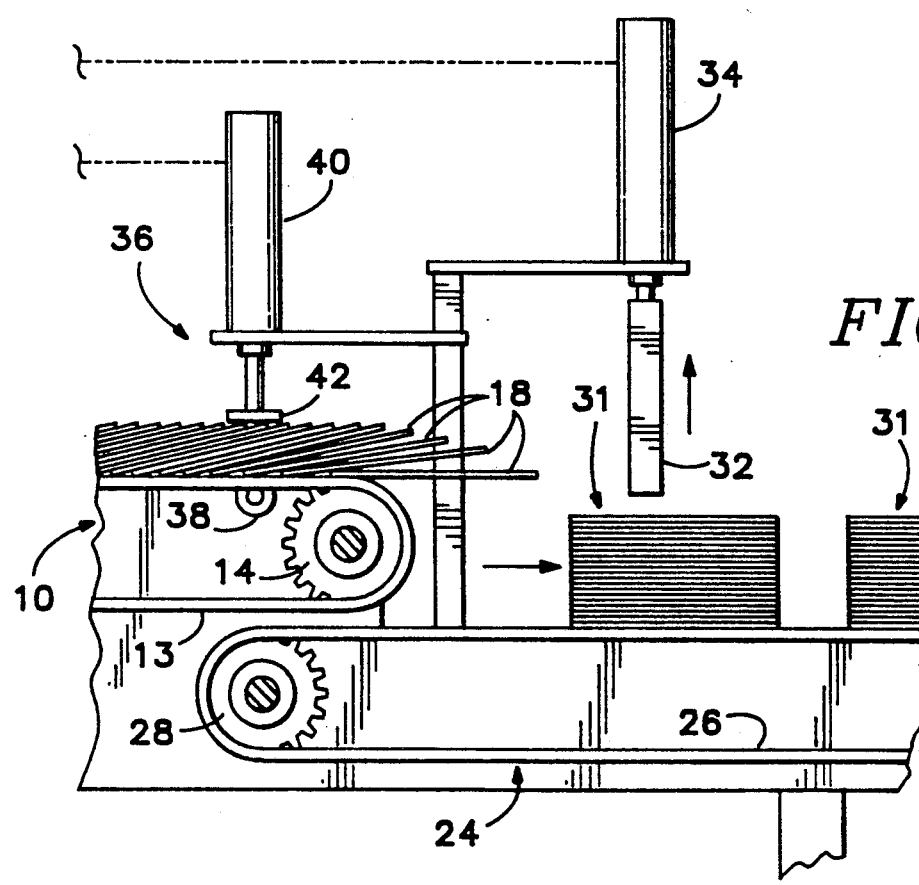

Once sufficient time has passed to permit the plates downstream of the clamps 36 to drop onto the stacks, the controller causes the actuators 34 to raise the gates 32 and engages the clutch 30 to start operation of the second conveyors 24, FIG. 4. Once a sufficient time has passed so that the just-formed stacks are entirely downstream of the gates, the controller causes the clutch 30 to be disengaged, the actuators 34 to lower the gates 32 and the actuators 40 to raise the pinch plates 42. Plates will then again be discharged from the first conveyors and start forming the next set of stacks.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for forming vertical stacks from a stream of horizontally oriented semi-rigid plates that overlap one another in a shingle fashion, comprising:

(a) first conveyor means having a generally planar upper surface defining a plane of conveyance for receiving and moving said stream of plates, said first conveyor means having a receiving end that receives the plates and a discharge end that the plates are discharged from;

(b) second conveyor means located downstream from and below said plane of conveyance, said second conveyor means receiving successive plates from said discharge end and including alignment means for aligning respective leading edges of said successive plates as said plates are received by said second conveyor means to form a stack thereon;

(c) means for advancing said second conveyor means each time a completed stack of plates is formed thereon to move the completed stack such that a new stack will be formed by plates being discharged from said first conveyor means;

(d) a clamping mechanism positioned intermediate said receiving end and said discharge end having upper and lower opposed jaws which engage plates in said stream for predetermined intervals to interrupt the discharge of plates from said first conveyor means, said upper jaw being movable and said lower jaw being fixed relative to said plane of conveyance;

(e) wherein said fixed lower jaw is vertically offset above said plane of conveyance to raise all plates passing over said lower jaw slightly above said plane of conveyance.

2. The apparatus of claim 1, wherein said alignment means comprises a stop associated with said second conveyor means and means for moving said stop between a lowered position where plates discharged from said first conveyor means contact said stop and a raised position where a stack of plates on second conveyor means can pass below said stop when said second conveyor means is advanced.

3. The apparatus of claim 1 including means for determining the number of plates being placed on said stack by said first conveyor means, and for simultaneously activating said clamping mechanism and said means for advancing said second conveyor means for a specified period of time when the stack contains a predetermined number of plates.

4. The apparatus of claim 1 wherein said fixed lower jaw is a roller.

* * * * *